United States Patent [19]
Weiler et al.

[11] 3,782,775
[45] Jan. 1, 1974

[54] CAMPER TIE-DOWN

[76] Inventors: Raywood C. Weiler; Gene H. Albers, both of 18738 5th St., Fontana, Calif.

[22] Filed: July 17, 1972

[21] Appl. No.: 272,117

[52] U.S. Cl. ......... 296/23 MC, 224/42.45, 280/179
[51] Int. Cl. ............................................. B60p 3/32
[58] Field of Search ...................... 296/23 MC, 35.1; 214/515; 280/179

[56] References Cited
UNITED STATES PATENTS
3,540,772  11/1970  Weiler ........................... 296/23 MC
3,489,454  1/1970   Manteufel ...................... 296/23 MC Primary Examiner—Philip Goodman
Attorney—Dana E. Keech

[57] ABSTRACT

A tie-down device for campers carried in pick-up trucks in which the top edge portions of the side walls of the truck bed are bent outwardly from said walls and then downwardly in various configurations, the tie-down device having a lip clamp disposed outside said truck side wall and being adaptable to the various conformations of the out-turned lips formed on said walls. An inner leg is provided on the device which provides a relatively long-radius bearing against the inner face of the truck side wall while an outer leg on the device provides an anchor boom for attaching a turnbuckle for tieing the camper down to the truck.

7 Claims, 4 Drawing Figures

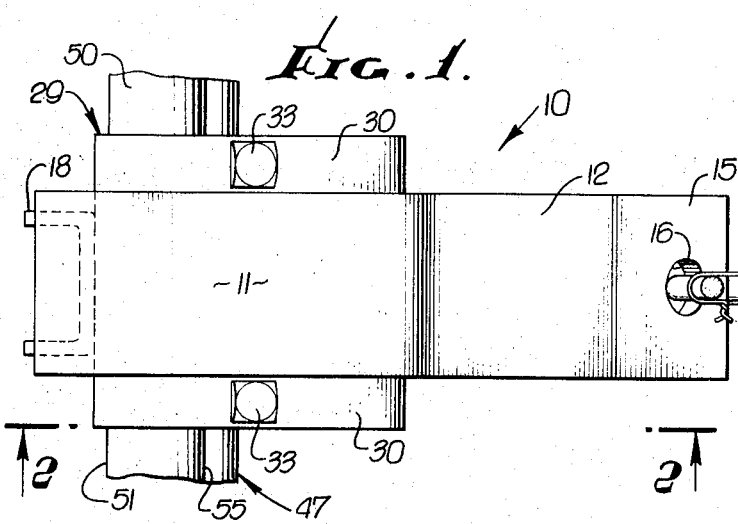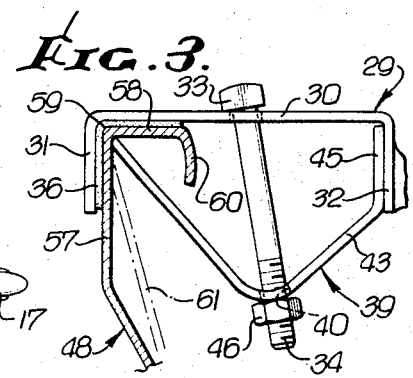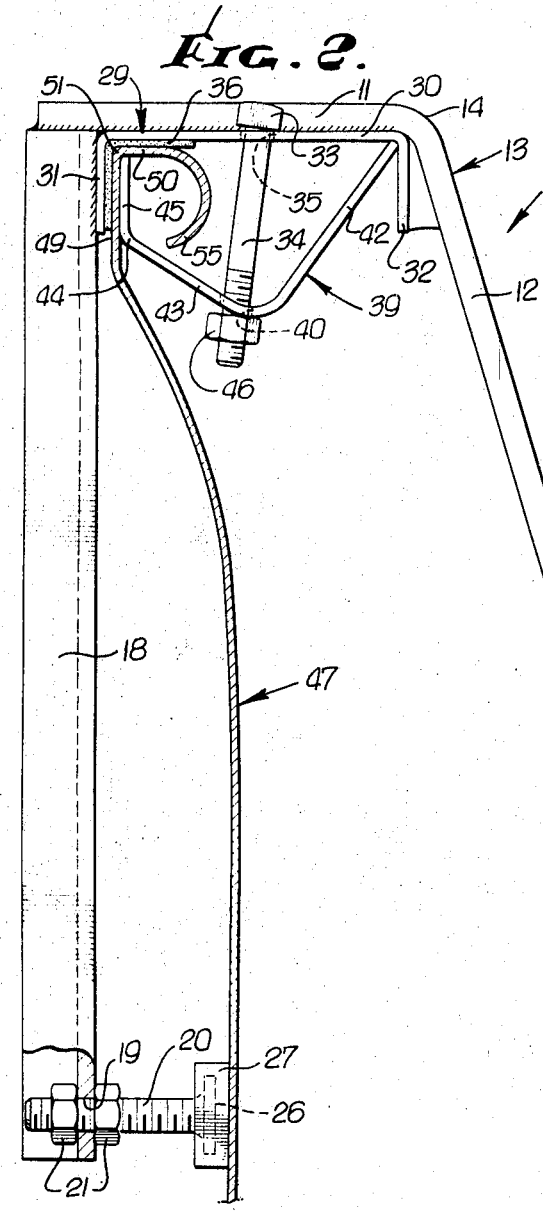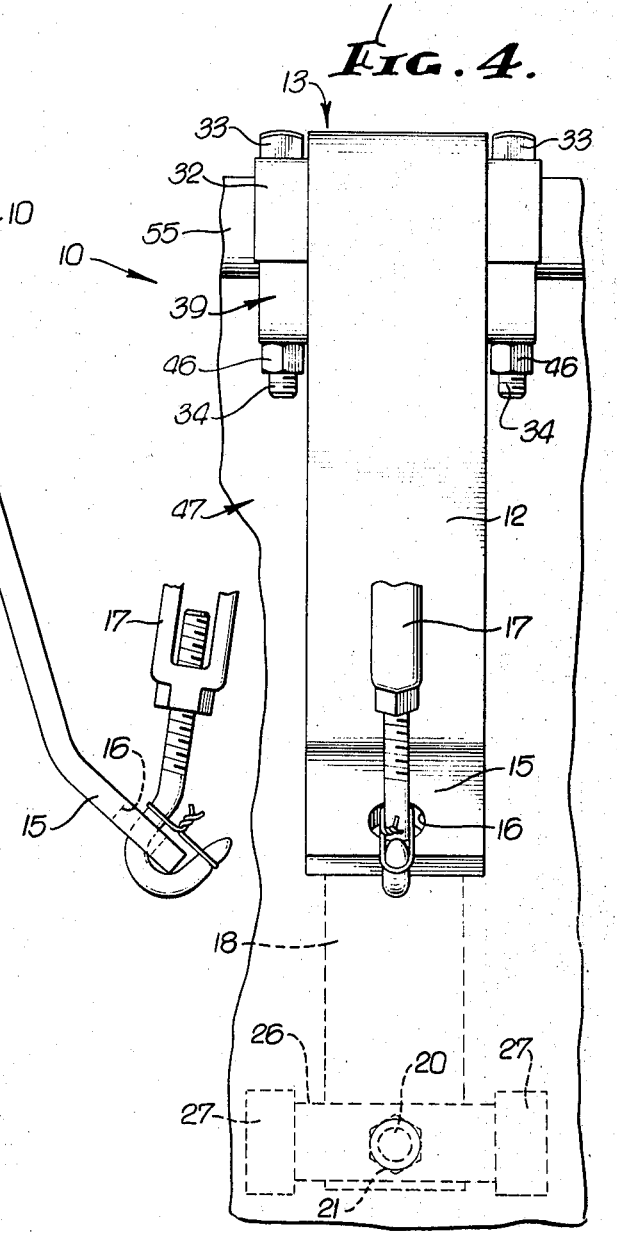

CAMPER TIE-DOWN

SUMMARY OF THE INVENTION

The invention is an improvement on the camper tie-down shown in U.S. Pat. No. 3,540,772 which issued Nov. 17, 1970 and which was especially adapted for application to the upper edge of a side wall of a truck bed in which the metal wall edge is bent horizontally inwardly and then flared downwardly, a feature of construction common to practically all American made pick-up truck bodies.

Many pick-up trucks recently appearing on the market, and particularly those of foreign origin, have upper edge portions of the side walls of the truck bed bent outwardly and downwardly from said walls so that the tie-down covered by said patent is not applicable to the last mentioned group of modern pick-up trucks. The peculiar above mentioned characteristic of this group of modern pick-up trucks involves variations in the conformation of the outward and downward bent top edges of the truck bed side walls, which makes it particularly difficult to design a camper-tie-down which is applicable, without modification, to all of this group of modern pick-up trucks.

It is the prime object of the present invention to provide a camper tie-down which is adapted for use with any of the gruop of modern pick-up trucks above mentioned.

Another broad object of the invention is the provision of such a tie-down device which is of the type currently marketed by us under the trademark "Straddle Mount" and which includes a pair of legs securely welded together at their upper ends so as to hook over the truck bed side wall with one leg extending downwardly along side and engaging the inner face of the wall and the other leg extending downwardly opposite the outer face of the wall for anchoring the camper to the wall and with a clamp means for securing the device to the truck bed side wall located outside said wall, instead of inside said wall as was the case with said patented tie-down.

BRIEF DESCRIPTION OF THE DRAWINGS

FIG. 1 is a plan view to a scale of 1 inch equals 2 inch of a preferred embodiment of the invention applied to a truck bed side wall of the modern type above described and having a deeply downwardly and outwardly curled lip.

FIG. 2 is a vertical sectional view taken on the line 2—2 of FIG. 1.

FIG. 3 is a diagrammatic illustration of a portion of FIG. 2 and showing the tie-down of the invention applied to a truck bed side wall having an out-turned upper edge with much shallower downturned lip and showing the clamping member reversed from its position in FIG. 2.

FIG. 4 is an outside elevational view of the invention to the scale shown in FIGS. 1 and 2.

DESCRIPTION OF THE PREFERRED EMBODIMENT

The invention is shown in the drawings as embodied in a camper tie-down device 10 which is of the general type currently marketed by us under the trademark Straddle Mount and which is shaped like an inverted V. The device includes a top normally horizontal element 11 and an outer leg 12 which are formed of a single heavy steel bar 13 which is bent downwardly at 14 at an angle of approximately 108°, a lower end portion 15 of leg 12 being bent outwardly at an angle of approximately 150° and having a hole 16 formed therein for use in attaching to the device 10 a camper tie-down turnbuckle 17. The device 10 also includes an inner leg 18 comprising preferably a length of structural steel channel, the upper end of which is rigidly welded to the inner end of top horizontal element 11. Provided in a lower end portion of inner leg 18 is a hole 19 in which a threaded rod 20 is slideable, this rod having a pair of set nuts 21 screwed thereon on opposite sides of said inner leg as seen in FIG. 2. The inner end of rod 20 has welded thereto a flat bar 26 opposite end portions of which have provided thereon pads 27 made of rubber, plastic or the like, for a purpose to be made clear hereinafter. The bar 26 and its associated parts will be referred to hereinafter as an adjustable stablizing bar.

Welded in place in the crotch formed within the top horizontal element 11 and the upper ends of the legs 12 and 18 is a shallow downwardly facing channel shaped 10 gauge sheet metal clamp base 29 including a top plate 30 which fits flat against the lower face of top horizontal element 11 and is securely welded thereto and down bent inner and outer flanges 31 and 32 which are welded respectively to upper portions of the legs 12 and 18. The clamp base 29 extends forwardly and backwardly from the top horizontal element 11 approximately the width of the square head 33 of a bolt 34 and said extending portions of the top plate 30 of said base has holes 35 to receive a pair of such bolts with said bolts extending downwardly through said plate as shown in the drawings. The centers of holes 35 for receiving said bolts are located approximately midway between inner and outer flanges 31 and 32 and preferably ⅛ inch closer to flange 31 than to flange 32.

Glued to the bottom and inward faces respectively of top plate 30 and inner flange 31 in the angle made therebetween is a pad 36 of felt, rubber or other cushioning material, to protect the vehicle upon which the tie-down 10 is applied.

The device 10 also includes a clamp member 39 formed of a rectangular piece of hot rolled sheet steel preferably about 10 gauge in thickness, which is punched with a pair of half inch holes 40 near its side edges along a line parallel with its end edges. The plate forming clamp member 39 is bent in its middle area at an angle of approximately 90° to divide said member into a relatively flat wing 42 and an opposite wing 43 which is bent along line 44 parallel with the center line of holes 40 to provide thereon an inbent wing tip portion 45 angled relative to wing 43 approximately 130°. Wing tip portion 45 is about one inch wide. The center line of holes 40 is about one half inch closer to the end edge of bent wing 43 than it is to the end edge of flat wing 42. These end edges are spaced apart in the clamp member 39 when this is free from compressive forces approximately three and one-half inches. The clamp member 39 is optionally assembled on the bolts 34 by use of nuts 46 so as to be related in clamping relation to the clamp base 29 either as shown in FIG. 2 or as reversely shown in FIG. 3.

The side wall 47 in FIG. 2 substantially reflects the cross-sectional contour of the truck bed side wall of the Courier pick-up truck made by Ford while the side wall 48 shown in FIG. 3 corresponds in contour to the side walls of the pick-up truck currently being put out by Datsun, as well as the truck put out by GM under the name LUV and the pick-up truck put out by Toyota.

As shown in FIG. 2, the sheet steel truck body side wall 47 has a vertical inner portion 49 at its upper edge from which a top side horizontal portion 50 is bent at a right angle 51. The outer edge of horizontal portion 50 has a deeply downwardly and inwardly curled lip 55.

When applying the tie-down 10 to the side wall 47 of a Courier pick-up truck as shown in FIG. 2, the clamp member 39 is oriented as shown in this view so that the bent wing 43 is disposed opposite the deeply curled lip 55 of this truck body side wall so as to extend freely between this lip and the vertical inner upper portion 49 of said wall so that bent wing tip portion 45 of the bent clamp wing 43 lies flat against said vertical inner side wall portion 49 and so that the end edge of the bent wing 43 enters and bears from within against the angle 51 formed between the vertical inner upper side wall portion 49 and the horizontal topmost portion 50 thereof.

It is to be noted that the inner flange 31 of the clamp base 29 lies flat against and supports the vertical inner upper portion 49 of the truck body side wall 47 so that the full pressure of the clamp member 39 created by tightening the nuts 46 on the bolts 34 is directed into the angle 51 formed at the upper inner edge of the truck body side wall 47. This compresses the pad 36 which protects the paint on the vehicle wall from being scratched and ridgily clamps the top side of truck body side wall 47 into the right angle formed in the clamp base 29 between the top plate 30 and inner flange 31 thereof.

As shown in FIG. 2, truck body side wall 47 is shaped outwardly from the lower edge of vertical upper inner portion 49 of said wall and the stabilizing bar 26 is adjusted by loosening the set nuts 21 on threaded rod 20 and resetting these to bring the pads 27 thereof to bear pressurally against the inner face of truck body side wall 47.

After the device 10 has thus been applied to truck body side wall 47, the turnbuckle 17 is fastened to the camper which the device 10 is provided to tie down and tightened to place the turnbuckle under tension.

The alternative mode of applying clamp member 39 shown in FIG. 3 is optional when the pick-up truck involved has a side wall lacking the deeply downcurled lip 55 shown in FIG. 2. The truck body side wall 48 shown in FIG. 3 has an uppermost vertical inner portion 57 and a tip side horizontal portion 58 which forms a right angle 59 therewith, and terminates in a short downward curl 60. With this type of truck body side wall, the clamp member 39 can be reversed as shown in FIG. 3, so that the flat wing 42 thereof extends from the inside into the angle 59 at the upper inner corner of the truck body side wall 48. Tightening of the nuts 46 on the bolts 34 with the clamp member 39 so applied concentrates a maximum binding force at the critical point, to wit, the angle 59, in applying the tie-down 10 to this truck.

The wall 48 is not shaped to require the exercise of the option illustrated in FIG. 3 as the tie-down 10 could be applied to wall 48 in the manner shown in FIG. 2 and effectively unite the tie-down with the truck.

In any case where a truck body wall 61 is met with which is like wall 48 in not having a deeply down turned lip 55, as shown in FIG. 2, but which is inclined outwardly beginning at the angle 59 in FIG. 3, as shown in broken lines in that view, the only choice is to apply the clamping member 39 to truck body wall 61 with member 39 reversed as shown in FIG. 3.

I Claim:

1. A camper tie-down device releasably attachable to a horizontally outwardly bent upper edge portion of a pick-up truck body side wall, said device comprising:
   a concave clamp base embracing and directly engaging said wall upper edge portion both from above and from the inside of said truck body;
   a clamp member disposed outside said truck body and bearing upwardly against said wall upper outturned edge portion in opposition to said clamp base;
   means to forcefully advance said member upwardly towards said clamp base to tightly grip said outwardly bent wall upper edge portion and rigidly unite said clamp base and clamp member with said wall upper edge portion; and
   means provided on said device suitable for connecting the same to a camper to tie said camper to said wall.

2. A device as recited in claim 1 including
   a stabilizing leg provided on said clamp base which extends downward therefrom a substantial distance inside said truck body and into engagement with said wall at the lower end of said leg to stabilize said device in its functioning as a means for anchoring a camper to said wall.

3. A device as recited in claim 2 including
   an anchor leg provided on said clamp base which extends downward therefrom outside said truck body to provide said means for attaching said tie-down to a camper.

4. A device as recited in claim 1 wherein
   said clamp base is channel shaped and fits downwardly to embrace said wall upper edge portion both from above and from the inside of said truck body; and wherein
   said clamp member comprises a rectangular sheet of metal bent transversely near the middle thereof to form opposed wings, the extremities of which fit closely into opposite portions of said channel base, at least one of said wings being bent transversely so that the end portion of said bent wing lies close to and approximately parallel with an adjacent side flange of said channel shaped clamp base; and
   bolt means tieing clamp base and clamp member in assembled relation and operative to apply said clamp member to said clamp base when the latter is fitted onto said wall upper edge portion to tightly grip the latter in the corner of said channel shaped clamp base receiving said wall upper edge portion and rigidly unite said clamp base and clamp member to said wall upper edge portion.

5. A device as recited in claim 4 wherein
   one of the wings of said clamp member is a bent wing and the other wing is a straight wing and in which the option is afforded of assembling said clamp member on said clamp base with either of said wings disposed in the end of said channel shaped clamp base which is provided for receiving said wall upper edge portion.

6. A combination as in claim 5 wherein
   said channel shaped clamp base is reinforced by a heavy steel bar;

a stabilizing leg comprising a section of steel channel which is welded to an inner extending end of said bar; and an anchoring leg formed by an outward downward extension of said reinforcing bar at the outer end of said channel-formed clamp base.

7. A combination as in claim 6 wherein said channel shaped clamp base is substantially wider than said reinforcing bar and extends in opposite directions laterally from the side edges of said bar; and wherein said clamp bolt means comprise a pair of bolts received in suitable edge apertures formed in said clamp base and said clamp member for use in constricting said clamp means on said wall upper edge portion.

* * * * *

UNITED STATES PATENT OFFICE
CERTIFICATE OF CORRECTION

Patent No. 3,782,775  Dated January 1, 1974.

Inventor(s) Raywood C. Weiler et al.

It is certified that error appears in the above-identified patent and that said Letters Patent are hereby corrected as shown below:

On the cover sheet, in the heading, item 76 the inventors' address should read -- 18738 5th Street, Bloomington, California --. Column 4, line 49, after "tieing" insert -- said --.

Signed and sealed this 21st day of May 1974.

(SEAL)
Attest:

EDWARD M.FLETCHER,JR.　　　　　　　　　C. MARSHALL DANN
Attesting Officer　　　　　　　　　　　Commissioner of Patents